Feb. 24, 1959 S. WLASUK 2,875,414
MODULATOR CIRCUIT
Filed May 21, 1956
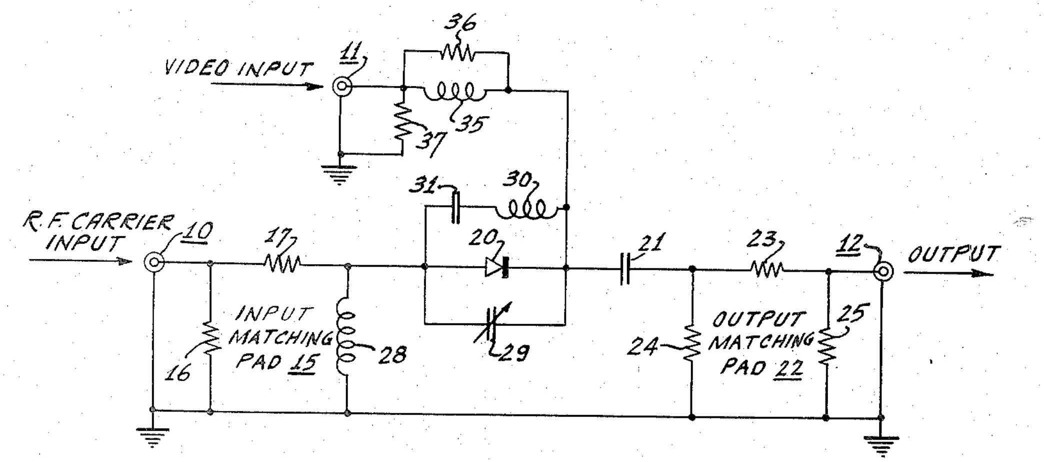
INVENTOR.
STEVEN WLASUK
BY
Charles H. Brown
ATTORNEY 2,875,414
Patented Feb. 24, 1959

2,875,414

MODULATOR CIRCUIT

Steven Wlasuk, Brooklawn, N. J., assignor to Radio Corporation of America, a corporation of Delaware Application May 21, 1956, Serial No. 586,187

1 Claim. (Cl. 332—52)

The invention relates to modulator circuits, and particularly to modulator circuits for use in test equipment.

Another object of the invention is to provide a novel and improved modulator circuit for use in test equipment.

Another object of the invention is to provide an improved modulator circuit that permits a test signal to be modulated to a high degree.

Briefly, the invention comprises a diode rectifier to which a carrier signal and a modulating signal are applied. In order that the inherent capacity of the diode rectifier may be neutralized, an inductor is connected in parallel with the diode rectifier and is tuned so that it resonates with the inherent capacity of the diode rectifier at the frequency of the carrier signal. Thus, the diode rectifier presents a high impedance at the carrier frequency so that a high degree of modulation may be obtained.

The invention is explained in detail in connection with the accompanying drawing which shows a schematic diagram of the improved modulator. In the embodiment illustrated, a radio frequency (R. F.) input terminal 10, a video input terminal 11, and an output terminal 12 are used. While the three terminals 10, 11, 12 are shown as coaxial terminals each having inner and outer conductors, ordinary terminals can be used. The outer conductors of the three terminals 10, 11, 12 are connected to a common point of reference potential, such as a chassis, but shown in the drawing as ground. The inner conductor of the R. F. input terminal 10 is connected to an input matching pad 15. The input matching pad 15 comprises a shunting resistor 16 connected between the inner conductor of the R. F. input terminal 10 and the point of reference potential, and a series resistor 17 having one end connected to the inner conductor of the R. F. input terminal 10. A non-linear diode rectifier, such as a crystal diode 20, has its input terminal connected to the other end of the series resistor 17 and its output terminal connected to one end of a first blocking capacitor 21. The other end of the first blocking capacitor 21 is connected to an output matching pad 22. The output matching pad 22 comprises a series resistor 23 which is connected between the other end of the first blocking capacitor 21 and the inner conductor of the output terminal 12, a first shunting resistor 24 connected between the other end of the first blocking capacitor 21 and the point of reference potential, and a second shunting resistor 25 connected between the inner conductor of the output terminal 12 and the point of reference potential. An R. F. choke coil 28 is connected between the input terminal of the crystal diode 20 and the point of reference potential. A variable trimmer capacitor 29 is connected in parallel with the crystal diode 20, and a series circuit comprising a neutralizing inductor 30 and a second blocking capacitor 31 are also connected in parallel with the crystal diode 20. For reasons that will be explained, the neutralizing inductor 30 has a value of inductance that resonates with the inherent capacity of the crystal diode 20 and with the capacity of the variable trimmer capacitor 29 at some desired frequency.

A peaking inductor 35 is connected between the inner conductor of the video input terminal 11 and the output terminal of the crystal diode 20. A damping resistor 36 is connected in parallel with the peaking inductor 35, and a video input terminating resistor 37 is connected between the inner conductor of the video input terminal 11 and the point of reference potential.

The modulator circuit is primarily designed for providing a simulated television signal to be used in aligning a television receiver. A radio frequency carrier signal, having the same frequency as the carrier frequency of a particular television picture channel, is supplied to the R. F. input terminal 10. A video testing signal is applied to the video input terminal 11. The radio frequency carrier signal is amplitude modulated by the crystal diode 20 in accordance with the video testing signal, and the modulated signal is derived from the output terminal 12. The degree or percentage of modulation obtainable from such a circuit is limited by the inherent capacity of the crystal diode 20. In order that this inherent capacity may be neutralized, the neutralizing inductor 30 has a value of inductance that resonates with the inherent capacity of the crystal diode 20, and any other capacity present across the crystal at the frequency of the radio frequency carrier signal. The effect of the second blocking capacitor 31 on the neutralizing inductor 30 may be neglected. From the drawing, it will be seen that the neutralizing inductor 30 is effectively in parallel with the crystal diode 20, so that a high impedance is presented to the radio frequency carrier signal at the crystal diode 20. Consequently, the inherent capacity of the crystal diode 20 is neutralized and a high degree or percentage of modulation can be obtained. If the Q of the neutralizing inductor 30 is kept sufficiently low, the impedance presented by the neutralizing inductor 30 and the capacity in parallel with it may be sufficiently high over a fairly wide range of carrier signal frequencies. This enables a high degree of modulation to be obtained over the same wide range of carrier signal frequencies, and eliminates the necessity of using a trimmer capacitor having a wide tuning range or the necessity of a neutralizing inductor for each carrier frequency. The first and second blocking capacitors 21, 31 are provided to prevent short-circuiting of the video signal. The R. F. choke coil 28 is provided to bypass any of the video signal which may be present at the R. F. input terminal 10. The peaking coil 35 is provided to give a flatter response to the video signal, and also serves as a choke coil for the radio frequency carrier signal. The input and output matching pads 15, 22 are provided to give impedance matching between the R. F. input terminal 10 and the output terminal 12.

In one modulator circuit constructed in accordance with the invention and with the schematic diagram shown in the drawing, the components had the following values:

| | | |
|---|---|---|
| Input matching pad **15**: | | |
| Shunting resistor **16** | ohms | 220 |
| Series resistor **17** | do | 100 |
| Output matching pad **22**: | | |
| Series resistor **23** | do | 100 |
| First shunting resistor **24** | do | 47 |
| Second shunting resistor **25** | do | 150 |
| Crystal diode **20** | | 1N34A |
| First blocking capacitor **21** | μμfd | 22 |
| Second blocking capacitor **31** | μμfd | 22 |
| Radio frequency choke coil **28** | μh | 1 |
| Trimmer capacitor **29** | μμfd | 1.5–7 |
| Neutralizing inductor **30** | μh | 1 |
| Peaking inductor **35** | μh | 5.6 |
| Damping resistor **36** | ohms | 820 |
| Video input terminating resistor **37** | do | 100 |

This modulator circuit permitted as much as 70% modulation of carrier signals for the television channels 1 through 6, which cover the frequency range of 54 to 88 megacycles. A second neutralizing inductor could be used to provide modulation for the television channels 7 through 13, which cover the frequency range of 174 to 216 megacycles.

The invention claimed is:

A modulator circuit comprising first and second radio frequency input terminals, first and second video input terminals, first and second ouput terminals, means connecting each of said second terminals to a common point of reference potential, a crystal diode having input and output terminals, an input matching pad comprising a series resistor connected between said first radio frequency input terminal and said diode input terminal and a shunting resistor connected between said first radio frequency input terminal and said point of reference potential, a radio frequency choke coil connected between said diode input terminal and said point of reference potential, a first blocking capacitor having one end connected to said diode output terminal, an output matching pad comprising a series resistor connected between the other end of said first blocking capacitor and said first output terminal, a shunting resistor connected between said other end of said first blocking capacitor and said point of reference potential, and a shunting resistor connected between said first output terminal and said point of reference potential, a variable trimmer capacitor connected between said diode input and output terminals, a series circuit comprising a neutralizing inductor and a second blocking capacitor connected between said diode input and output terminals, said neutralizing inductor having an inductance that resonates with the inherent capacity of said crystal diode and with the capacity of said trimmer capacitor at the frequency of a radio frequency signal applied to said radio frequency input terminals, a peaking inductor connected between said first video input terminal and said diode output terminal, a damping resistor connected in parallel with said peaking inductor, and a video input terminating resistor connected between said first video input terminal and said point of reference potential.

References Cited in the file of this patent

UNITED STATES PATENTS

| | | |
|---|---|---|
| 1,654,098 | Shea | Dec. 27, 1927 |
| 2,378,797 | Schade | June 19, 1945 |
| 2,510,075 | Clavier et al. | June 6, 1950 |
| 2,538,439 | Bedford et al. | Jan. 16, 1951 |
| 2,721,936 | Byrne et al. | Oct. 25, 1955 |

OTHER REFERENCES

Pub. I, "Balanced Crystal—Diode Modulator," Radio-Electronic Engineering, September 1953, pp. 10, 11 and 27.